United States Patent [19]
Pergent et al.

[11] Patent Number: 5,583,731
[45] Date of Patent: Dec. 10, 1996

[54] INPUT OR OUTPUT DEVICE, FOR PROGRAMMABLE AUTOMATIC CONTROLLERS TO DETECT AN ELECTRICAL FAULT OF THE CHANNELS

[75] Inventors: Jacky Pergent, Carros le Neuf; Pierre Gohl, La Colle sur Loup, both of France

[73] Assignee: Telemecanique, France

[21] Appl. No.: 940,411

[22] Filed: Sep. 3, 1992

[30] Foreign Application Priority Data

Sep. 5, 1991 [FR] France ................................ 91 10971

[51] Int. Cl.⁶ .................... H03K 17/0812; G05F 1/573; H02H 3/26
[52] U.S. Cl. ............................ 361/86; 340/661; 340/664
[58] Field of Search ................................ 395/275, 200; 361/86, 88; 455/41; 364/140, 424.01

[56] References Cited

U.S. PATENT DOCUMENTS

| | | | |
|---|---|---|---|
| 4,628,397 | 12/1986 | Gareis et al. | 361/98 |
| 4,631,623 | 12/1986 | Gohl | 361/86 |
| 4,736,340 | 4/1988 | Desserrieres et al. | 395/155 |
| 4,774,656 | 9/1988 | Quatse et al. | 395/182.02 |
| 4,951,250 | 8/1990 | Cruickshank et al. | 395/832 |
| 4,965,800 | 10/1990 | Farnbach | 371/22.1 |
| 5,007,042 | 4/1991 | Santi | 370/9 |
| 5,062,072 | 10/1991 | Gohl et al. | 395/882 |
| 5,432,945 | 7/1995 | Pergent et al. | 395/750 |

FOREIGN PATENT DOCUMENTS 2607274 11/1986 France .
2650451 2/1991 France .

*Primary Examiner*—William M. Treat
*Attorney, Agent, or Firm*—William A. Drucker

[57] ABSTRACT

A device is adapted to be associated with a group of input or output channels, especially of a programmable automatic controller, to detect if the channels are subject to an open circuit and/or an overcurrent. To each channel are assigned two analog comparators connected to a processor logic circuit which connects one or the other comparator output to a control unit. Configurator logic activates or deactivates one or the other of the comparators and associated forcing devices and filters according to the operating mode selected.

11 Claims, 3 Drawing Sheets

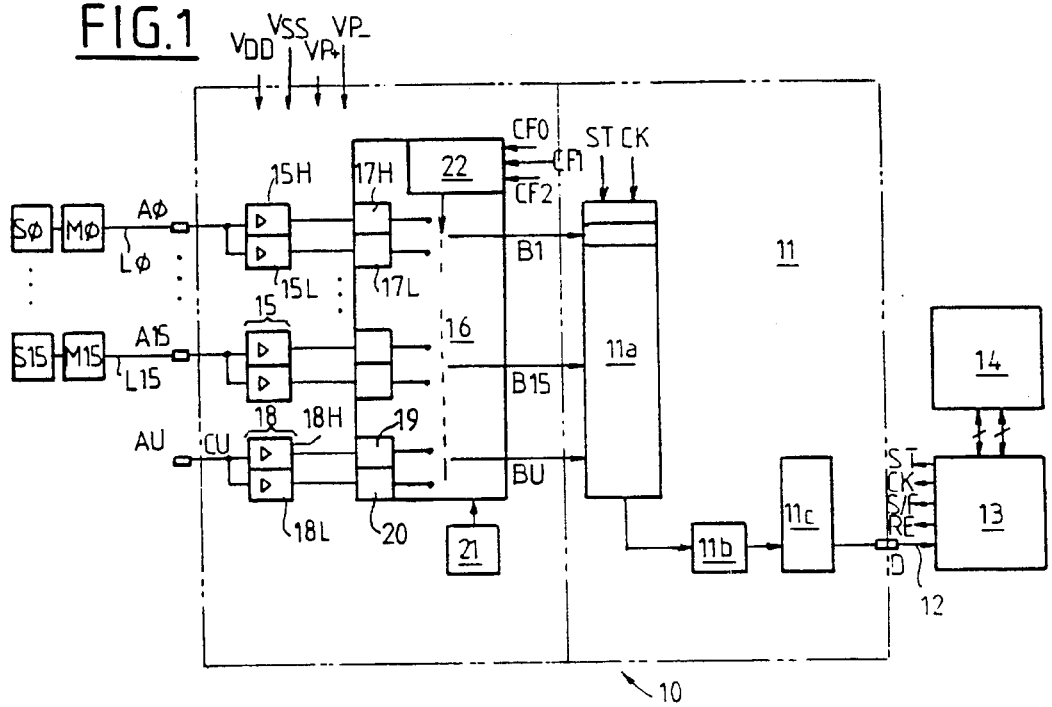
FIG.1
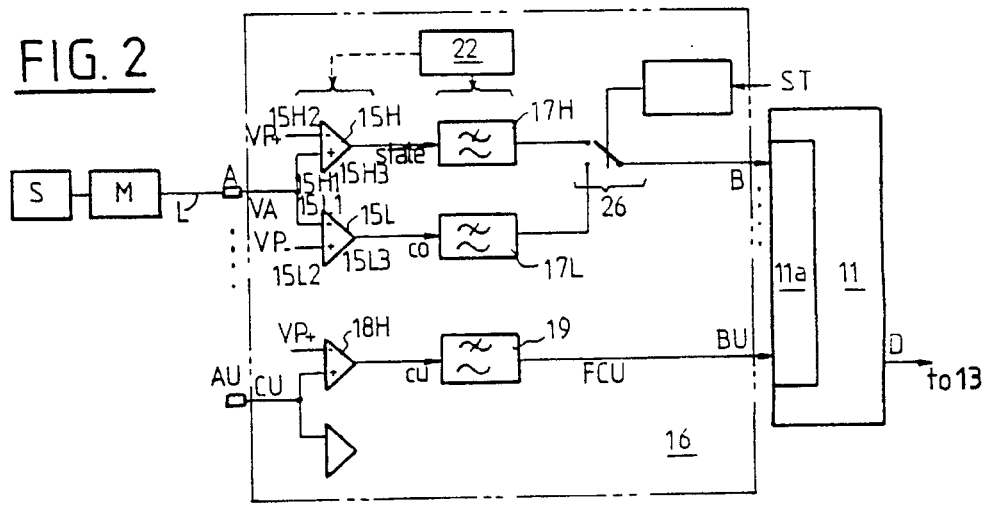
FIG.2
FIG.3

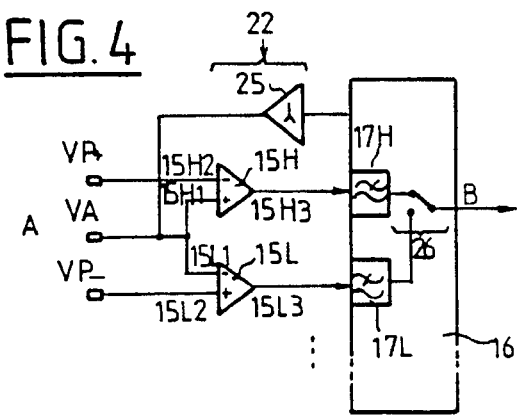
FIG.4
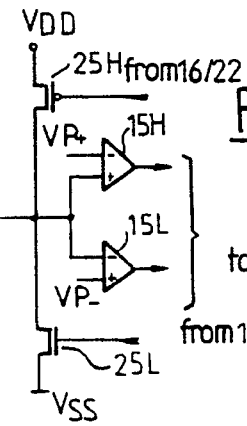
FIG.5
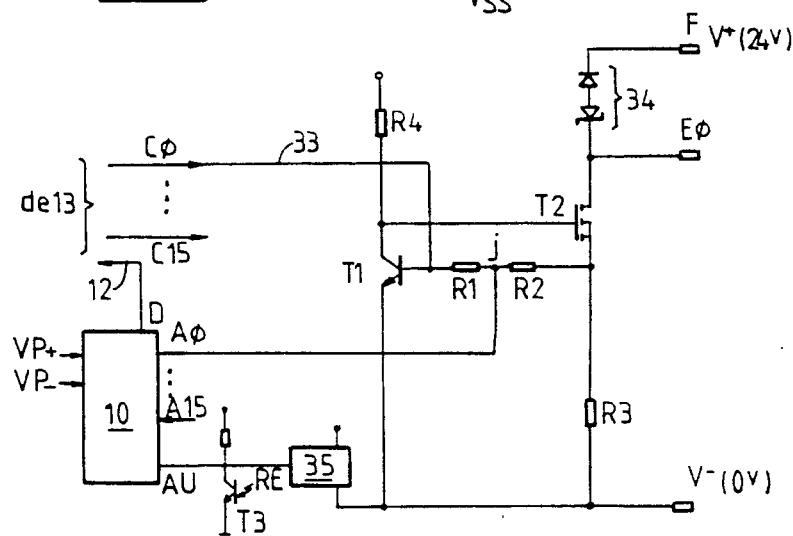
FIG.6
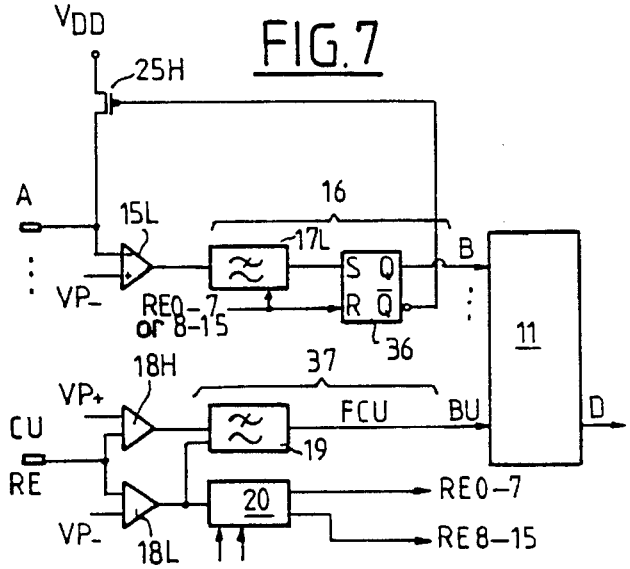
FIG.7
FIG.8
|  | cc | cu |
|---|---|---|
| VP+ | 1 | 1 |
| VP− | 1 | 0 |
|  | 0 | 0 |
FIG.9
|  | cc | cu |
|---|---|---|
| VP+ | 0 | 1 |
| VP− | 1 | 0 |
|  | 1 | 0 |

FIG.10
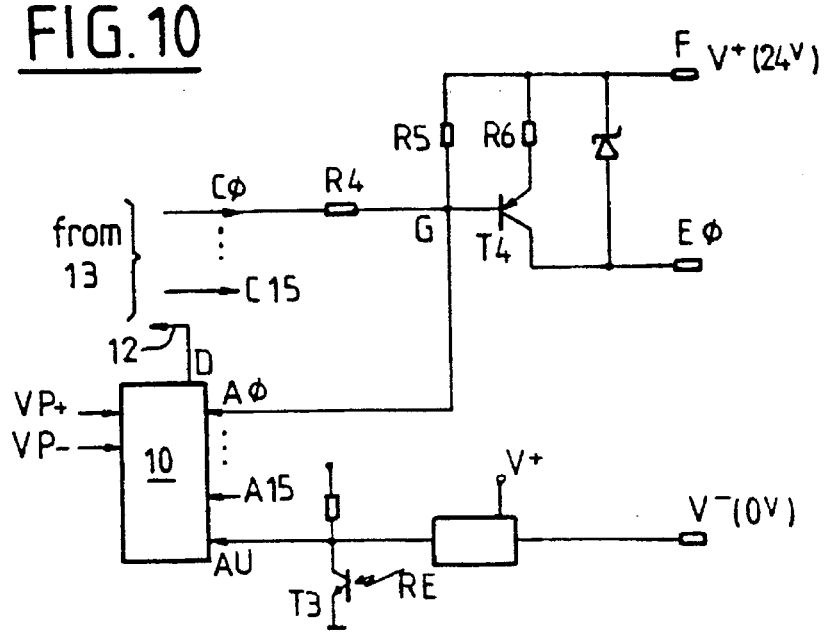
FIG.11
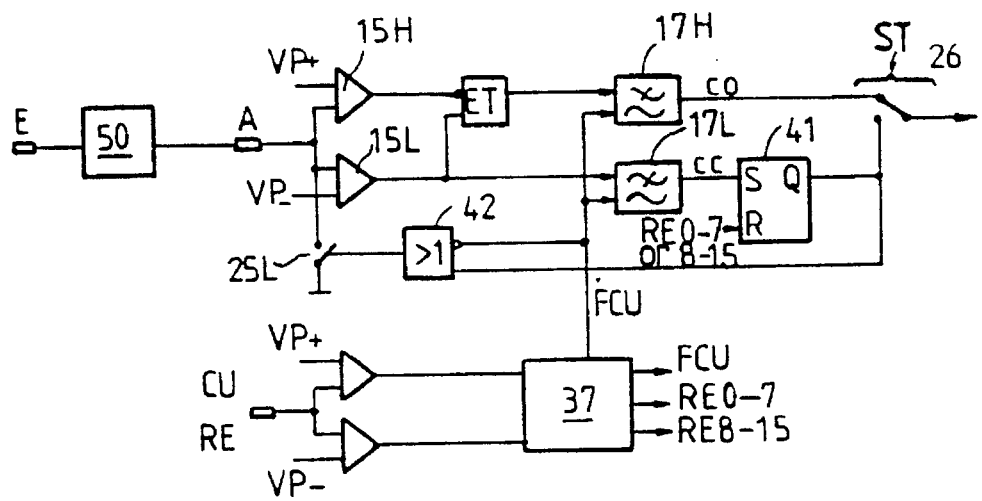
FIG.12
|     | cc | co | cu |
|-----|----|----|----|
|     | 0  | 0  | 1  |
| VP+ | 0  | 1  | 0  |
| VP- | 1  | 0  | 0  |

5,583,731

1

INPUT OR OUTPUT DEVICE, FOR PROGRAMMABLE AUTOMATIC CONTROLLERS TO DETECT AN ELECTRICAL FAULT OF THE CHANNELS

BACKGROUND OF THE INVENTION

1. Field of the Invention

The present invention concerns a device adapted to be associated with a group of input or output channels of a programmable control system, especially a programmable automatic controller, in particular to detect if the channels in question are subject to an electrical fault referred to as a line fault such as an open circuit and/or an overcurrent.

2. Description of the Prior Art

Existing input devices for programmable automatic controllers comprise input channels connected to sensors and a circuit for serial routing of data relating to a group of input channels. The serial routing circuit is connected to an input and/or output control unit in turn connected to a central processor unit and it is adapted to transmit to the control unit words made up of data bits relating to the channels consecutively scanned.

It would be beneficial for an input device of this kind, described in the U.S. Pat. No. 5,062,072 to be able to detect line faults representing an incident such as inadvertant opening of an input or output circuit or a short circuit on an output channel.

A particular object of the invention is to enable detection of line faults affecting input or output channels of an automatic control system such as a programmable automatic controller and to advise the input and/or output control unit of the system of such faults by means of comparator cells enabling adaptation to diverse input or output situations.

SUMMARY OF THE INVENTION

The present invention consists in an input or output device for programmable control systems, in particular for programmable automatic controllers, comprising for a group of channels a circuit for routing data relating to said channels to an input and/or output control unit and comprising for each channel an analog comparator unit receiving on a first input an analog voltage representing the state of the channel and on a second input a threshold voltage and means for modifying the state voltage according to an electrical fault on the channel, said comparator unit having an output connected to a processor logic circuit, in which device:

said analog comparator unit comprises two comparators the first input of which receives the channel state voltage and the second input of which receives respectively a high and low threshold voltage, and said processor logic circuit is connected via said routing circuit to an input of said control unit and is adapted to switch to said input one or other output of said comparators according to the required application by means of configurator logic.

It is therefore possible to switch one or the other of the comparator outputs to the input of the routing circuit on the basis of a cyclic switching signal to convey alternately on a serial line to the control unit (and depending on the mode of application of the device) status frames and open circuit or overcurrent monitor frames (in the mode known as the input mode) or open circuit and overcurrent monitor frames (in the mode known as the output mode) combining the data for the group of channels.

2

If the device is associated with output channels, a device is preferably provided for forcing the state voltage to a high or low level, this device being commanded by the processor to disable the output channel in the event of an overcurrent. Depending on the application, configuration logic selects the comparators, the components of the forcing device or other components of the processor which must be activated or deactivated and can also modify the filter times of the various filters.

The sensor, pre-actuator or relay coil supply voltage may be monitored by means of a set of two comparators similar to the comparator unit described above, these two comparators being respectively assigned to detecting a supply undervoltage and to resetting output channels.

The following description with reference to the appended drawings explains the features and advantages of one embodiment of the invention.

BRIEF DESCRIPTION OF THE DRAWINGS

FIG. 1 is a block diagram of a programmable automatic controller line monitoring input device in accordance with the invention.

FIG. 2 is a more detailed block diagram of part of the FIG. 1 device.

FIG. 3 is a table showing the logic state of the comparator outputs in the FIG. 2 device.

FIG. 4 is a block diagram showing part of an input or output channel in a device in accordance with the invention.

FIG. 5 shows a preferred embodiment of part of the FIG. 2 channel.

FIG. 6 is a block diagram of a programmable automatic controller output circuit comprising a device in accordance with the invention assigned to short circuit monitoring.

FIG. 7 is a more detailed block diagram of part of the FIG. 6 device.

FIGS. 8 and 9 are tables for two different applications respectively using negative and positive logic.

FIG. 10 is a variation of the FIG. 6 block diagram in an application of the device to protecting low-current outputs against short circuits.

FIGS. 11 and 12 relate to the application of the device to protecting output channels against short circuits and open circuits.

DETAILED DESCRIPTION OF THE INVENTION

The device 10 shown in FIG. 1 can be used for input channels (input mode) or output channels (output mode).

To clarify the description it will first be described associated with 16 input channels, by way of example. The input channels are cyclically scanned so that the incoming signals can be acquired and then processed according to a program defined by the user.

The device 10 comprises for each input channel a terminal A0–A15 connected by a line L to a respective sensor or signal generator S0–S15 referred to hereinafter for simplicity as a "sensor". Means M0–M15 are associated with the input channels to modify the analog voltage representing the state of each channel according to an electrical fault such as an open circuit or an overcurrent. These means may be incorporated into the sensor and comprise resistors, for example.

The device 10 comprises a channel data serial routing circuit 11 connected in a known manner by a terminal D and via a serial line 12 to an input and/or output control unit 13 in turn connected by a data bus and a service bus to a central processor unit 14 of the programmable automatic controller. The unit 13 manages input and output and generates appropriate clock and service signals.

Each terminal A0–A15 is connected to an analog comparator unit 15 comprising two comparators 15H, 15L. Each comparator receives on a first input 15H1, 15L1 (see FIG. 2) the analog voltage representing the state of the channel and on a second input 15H2, 15L2 a high threshold voltage VP+ and a low threshold voltage VP−, respectively.

The outputs 15H3, 15L3 of the two comparators are connected to a logic processor and filter circuit 16.

The latter comprises for each output of a comparator 15H, 15L respective filter means 17H, 17L adapted to be configured by signals CF0–CF2 generated by the device 10 or by a signal S/F generated by the unit 13.

The device 10 additionally receives supply voltages $V_{DD}$, $V_{SS}$ and clock signals CK and frame signals ST (at a frequency which is a submultiple of the frequency of the clock signals CK) supplied by the unit 13. When necessary, this supplies a signal S/F for programming a respective slow or fast filter time for a group of input channels. If the device is used in an application involving detection of short circuits via the comparator unit 15 and protection against any short circuits detected by the unit 15 via the logic circuit 16, the unit 13 may additionally supply a reset signal RE which can be applied to the logic circuit 16 to reset the latter after it is tripped.

An input terminal AU of the device 10 receives a signal CU representing the supply voltage U to the sensors or input signal generators if the device is used for input channels or pre-actuators or actuators if the device is used for output channels.

The terminal AU is connected to a comparator unit 18 comprising two comparators 18H, 18L respectively assigned to voltage monitoring (input or output mode) and to the reset function (output mode). The high comparator 18H compares the signal CU with the high threshold VP+ which is the same as for the comparators 15H. The low comparator 18L is not used in an input protection or monitoring application. In an output protection or monitoring application the low comparator 18L compares with a threshold the reset signal RE generated on the reset following detection of a short circuit on at least one channel. The signal RE is supplied by the unit 13 and substituted for the signal CU at the terminal AU by means described later.

The logic circuit 16 is a processor which comprises logic filters 17H, 17L associated with the outputs of the respective comparators 15H, 15L and a logic filter 19 associated with the output of the comparator 18H. A reset detector circuit 20 is associated with the output of the comparator 18L. A dedicated clock 21 is assigned to the processor 16 so that the major part of this circuit, especially the filters, operate at a speed which is independent of that of the circuit 11, which is timed by the signals ST and CK supplied by the control unit 13. Additionally, the processor 16 receives the configuration signals CF0, CF1, CF2; these signals are applied to configurator logic 22 which configures the device according to the required application and in particular modifies appropriately the filter times of the filters 17H, 17L, 19.

The circuit 16 multiplexes the outputs of the high and low comparators for presentation to the routing circuit 11. As described in the U.S. Pat. No. 5,062,072, the circuit 11 includes a parallel-serial register 11a, a parity check circuit 11b and a system 11c of logic and registers connected to the terminal D via which the state and fault data frames are routed to the control unit 13, with the bits and frames timed by the signals CK and ST.

FIG. 2 shows in more detail an input channel of the FIG. 1 device. The input terminal A is connected to the inputs 15H1, 15L1 of the high and low comparators 15H, 15L. The threshold VP+ (2.5 V, for example) of the comparator 15H is used to determine if the channel is on or off and the threshold VP− (0.6 V, for example) is used to determine if the state of the channel is normal or if there is an open circuit fault. Specifically, an open circuit on the line L can be detected in a known manner by a means M consisting of a high-value resistor shunting the sensor even when the sensor is open circuit, this causes a low current to flow through the terminal A and this current ceases to flow if the channel is accidentally open circuited. The terminal AU is connected via the comparator 18H to a logic filter 19 whose output is connected to the input BU of the circuit 11. The output of the comparator 18L is not connected. The state of the filtered signal FCU available at the output of the filter 19 can obviously therefore be acted on to be incorporated into the data frames transmitted to the unit 13.

The FIG. 3 table shows that the channel is regarded as on (1) if VA>VP+ and off (0) if VA<VP+; the input line is regarded as open circuit if VA<VP− and normal if VA>VP− (column C0). The sensor supply voltage U is normal if CU>VP+ or abnormal if CU<VP+ (column CU).

FIG. 4 shows one embodiment of the comparator unit 15 associated with a respective terminal A of an input or output channel. To facilitate use of the device when applied to output protection, a three-state unit 25 is provided between the processor circuit 16 and the terminal A; in a high-impedance state the unit 25 allows the channel voltage to be applied to the comparator inputs 15H1, 15L1; in its two low-impedance states the unit 25 forces the voltage at the terminal A to a respectively high or low level which enables the processor 16 to disable the respective output channel in a way that will be described later.

A switch 26 is provided in the processor 16 for switching in a manner dependent on the application and either permanently or cyclically the outputs of the two comparators 15H, 15L to an output B of the circuit 16 which is connected to the serializer register 11a of the circuit 11. This switching can be alternate switching, using the frame signal ST, for example. Thus in the FIG. 1 input mode the register 11a receives bits B1–B15 which may alternately represent the state of the sensors and open circuiting of the respective circuits; the register 11a therefore forms alternate "state" and "open circuit" frames which are routed successively to the control unit 13. In an output mode to be described later bits B1–B15 can alternately represent the presence of a short circuit on the various output lines and open circuiting of these various lines.

FIG. 5 shows a preferred embodiment of the three-state unit 25. It uses a P-channel MOS switch 25H and an N-channel MOS switch 25L respectively connected between the potential $V_{DD}$ and the terminal A and between the latter terminal and the potential $V_{SS}$. The gates of the MOS switches are controlled selectively by the circuit 16 and its logic 22 as explained later.

The device described with reference to FIGS. 1 and 4 can also be used to protect output channels against short circuits and/or to report the "open circuit" state of these channels. If there are 16 output channels the terminals A1–A15 are connected to acuators or preactuators and the terminal AU is used to monitor the output channel supply voltage and also to input a reset signal if the channels are disabled in response to a fault. Two separate terminals could naturally be provided for voltage monitoring and resetting.

FIGS. 6 through 8 show the application of the device to protecting negative logic DC outputs.

With 16 output channels, as shown in FIG. 6, the data is presented on 16 parallel outputs C0–C15. Each output C is connected by a conductor 33 to the base of an NPN type control transistor T1 whose collector is connected to a positive voltage (8 V, for example) and whose emitter is connected to a negative voltage V– (0 V, for example) and via a resistor bridge R1, R2 to the source of an N-channel MOS power transistor T2. The source of the transistor T2 is also connected to 0 V by a resistor R3; the gate of the transistor T2 is connected to the voltage 8 V and the drain of the transistor T2 is connected to the output terminal E0 and via non-return and/or protection means 34 to a supply voltage V+ (24 V, for example). The point J at which the resistors R1 and R2 are connected together is connected to the input terminal A of the device 10. The serial output terminal D of the device 10 returns data serially to the control unit 13. The input AU of the device 10 is connected to a voltage detector 35 and to a reset optocoupler T3 as shown; the optocoupler is responsive to the reset signal RE supplied by the control unit 13.

Referring to FIG. 7, which shows the main component parts of the device 10 active at this time, only the low comparator 15L and the switch 25H are connected for each output channel. The components 15H, 17H and 25L are inactive at this time. The output of the low filter 17L is connected to the input S of an RS flip-flop 36 whose Q output is connected to the terminal B of the processor circuit which is connected to the routing circuit 11 and, through an inverter, to the gate of the switch 25H. The active and inactive components are selected by the configurator logic 22.

With reference to the signals CU and RE, the outputs of the respective comparators 18H, 18L are filtered and processed by a circuit 37 comprising the filter 19 and the reset detector circuit 20 mentioned with reference to FIG. 1.

The filter 19 associated with the voltage monitoring terminal AU has its output connected to the circuit 11. The outputs of the detector circuit 20 are used to reset channels 0 through 7 (signal RE0–7) and 8 through 15 (signal RE8–15), respectively. The respective signal is applied for each group of eight channels to the filter 17L and to the input R of the flip-flop 36.

FIG. 8 shows that the presence or absence of a short circuit is detected (column CC) depending on whether the voltage at A is greater than or less than VP– and the presence or absence of the supply voltage is detected (column CU) depending on whether the signal CU is greater than or less than VP+.

Positive logic DC outputs are protected in the same manner, but using other components of the comparator cell activated by the configurator logic 22. The high comparator 15H and the high filter 17H are then connected to the flip-flop 36 and the low switch 25L is connected to the output of the flip-flop; the low comparator and the low filter 15L, 17L and the high switch 25H are inactive at this time.

To protect low-current (nominal current of 0.1 A, for example) DC outputs the configurator logic activates the high comparator 15H and the high filter 17H connected to the flip-flop 36 and the high switch 25H connected to the Q output of the flip-flop. The low comparator and the low switch are inactive at this time.

FIG. 9 shows for low-current and positive logic applications that the absence or the presence of a short circuit is detected (column CC) depending on whether the voltage at A is greater than or less than VP+.

FIG. 10 shows a low-current output channel protected by means of a device in accordance with the invention. Each output C is connected by a resistor R4 to the base of a transistor T4 and by a resistor R5 to a DC supply (24 V, for example) terminal F. The emitter of the transistor T4 is connected to the terminal F by a resistor R6 and the collector of the transistor T4 is connected to the output terminal E. The point G at which the resistors R4, R5 are connected together and to the base of the transistor T4 is connected to the input A of the protection device 10.

A device in accordance with the invention can also be used to protect DC outputs in coordination with an output control and supervisory device 50 which gives a different voltage signal according to whether it detects an open circuit fault or an overcurrent fault and which is adapted to open or close the output channel in response to a control signal. This supervisory device is part of the means M. In this case there are employed for each input A of the protection device 10 the two comparators 15H, 15L and the low switch 25L, as shown in FIG. 11. The outputs of the two comparators are connected to the inputs of an AND logic gate whose output is connected to the high filter 17H; the output of the comparator 15L is connected via the filter 17L to the input S of an RS flip-flop 41; the output Q of the flip-flop is connected to a switch 26 whose function is similar to that in FIG. 2 and to the gate of the switch 25L via an OR logic gate 42 which also receives the inverted filtered signal FCU.

The signal FCU is also applied to disable inputs of the filters 17H, 17L; in this way, in the absence of voltage, the signal FCU is at zero and freezes the filtering of short circuit faults (cc) and open circuit faults (co) and also resetting of the faulty outputs. Via the gate 42 the signal FCU turns on the switch 25L to disable the output channel with which the supervisory device 50 is associated. The flip-flop 41 can be reset by the reset signal RE of the respective group of channels. The signals FCU and RE 0–7, RE 8–15 are generated by a circuit 37 identical to that shown in FIG. 7.

Short circuits (cc) are processed by the low components 15L, 17L and open circuit faults (co) are processed by the high components 15H, 17H; the switch 26 whose operation is timed by the signal ST, in combination with the serial register 11a, forms successive multiplexed frames alternately representing short circuit faults and open circuit faults, respectively.

FIG. 12 shows the use of the thresholds VP+, VP– in the case of FIG. 11.

The device just described operates in the following manner.

If the "input" mode of the device is selected the logic 22 activates the appropriate components of the processor 16, as shown in FIG. 2.

If the line L is normal and in a first state of the sensor 5, the voltage VA is greater than VP+ so that the logic states at the outputs of the comparators 17H, 17L are respectively 1 and 0. With timing determined by the control input of the switch 26 (alternating in this instance) the bit B is therefore presented to the input of the circuit 11 with the value 1 to signify that the sensor is in its first state or the value 0 to signify that the line is normal.

If the line L is normal and in a second state of the sensor S, the voltage VA is between VP+ and VP– so that the logic states at the outputs of the comparators become 0 and 0. If the line is open circuit, the voltage VA is less than VP− and the logic states at the comparator outputs change to 0 and 1; this latter value enables the "line open circuit" indication to be sent to the control unit 13 over the serial link 12.

In the input protection application shown the low part 15L, 17L of the comparator unit is used to detect inadvertent open circuiting of the line. It would be possible to distinguish short circuits from open circuits by adding alongside the device 10 another device also connected to the terminals A and having high comparators 15H assigned a threshold VP+ greater than that of the device 10 (for example 4 volts as compared with 2.5 volts), to react to overcurrents.

If an "output" mode of the device is selected the logic 22 activates the appropriate components. Assuming that the chosen application is that of FIGS. 6 through 8, these components are those shown in FIG. 7. The state of the outputs determined by the central processor unit 14 is sent by the control unit 13 to the various channels. To disable a channel the respective transistor T1 is turned on by the output signal C; the transistor T2 is therefore turned off. To turn the channel on the transistor T1 is turned off by the signal C and the gate of the transistor T2 is at a sufficient potential to turn on the transistor T2.

If the channel load is normal the voltage across the resistor R3 remains low and the resulting voltage at A remains below VP−. Immediately an overcurrent condition occurs VA exceeds VP− and the flip-flop 36 of the processor circuit 16 (FIG. 7) turns on the switch 25H after a time determined by the filter means so that the potential at A is forced to $V_{DD}$ ($V_{SS}$+5 volts, for example), which increases the base potential of the transistor T1 and turns it on. The transistor T2 is then turned off and the output channel remains turned off until the control unit 13 sends the reset signal RE. Applied to the optocoupler T3, this signal allows the potential at A to assume a value depending on the output signal C and whether the fault persists. Sending the reset signals RE 0–7 and RE 8–15 for each group of eight channels resets the filters 17L and the flip-flops 36.

In the application described with reference to FIGS. 11 and 12, in response to an overcurrent the device 10 disables the output by changing the potential at the points A and H to $V_{SS}$ after a time defined by the filter means, the device 50 then disabling the output circuit.

We claim:

1. An output device for a programmable automatic controller, comprising a group of output channels and a circuit for routing data relating to said output channels to an input and/or output control unit connected by at least a data bus to a central processing unit, said control unit managing input and output data of said central processing unit and generating at least a clock signal and a frame signal, said routing circuit comprising for each of said output channels:

means for generating a state voltage representating a state of said output channel, means for modifying said state voltage upon occurrence of an electrical fault on said output channel, an analog comparator unit comprising a first comparator having a first input which receives said state voltage, a second input which receives a high threshold voltage, and a first output, and a second comparator having a third input which receives said state voltage, a fourth input which receives a low threshold voltage and a second output, a processor logic circuit having a selecting circuit which receives said frame signal and alternatively connects said first output and said second output to an input of a parallel/serial converter having a plurality of inputs respectively belonging to said output channels, said parallel/serial converter being controlled by said frame signal so as to apply on an input of the control unit, alternatively line open monitor frames and overcurrent monitor frames, each containing information about each of said output channels.

2. Device according to claim 1, wherein said first and second outputs of said comparators are connected to said selecting circuit by respective filter means, each having a filter time which is controlled by a configuration logic circuit.

3. Device according to claim 1 wherein a device for forcing said state voltage to a high or low level is incorporated with said processor logic circuit, said forcing device being controlled by the output of a comparator and connected to the first input of said comparator to disable a respective output channel in response to an overcurrent.

4. Device according to claim 3 wherein said forcing device comprises two switches respectively applying a high voltage and a low voltage to said first and third inputs of said first and second comparators, said switches being controlled by said configuration logic circuit according to the application.

5. Device according to claim 1 comprising a supply voltage monitor unit comprising a first comparator receiving on a first input a channel supply voltage and on a second input a threshold voltage, said comparator having an output provided with filtering means, said output being connected to said selecting circuit.

6. Device according to claim 5 further comprising a second comparator receiving on a first input a reset voltage and on a second input a threshold voltage, said second comparator having an output connected to a reset detector and to said filtering means so as to disable said filtering means on resetting.

7. Device according to claim 1 wherein said means for modifying the state voltage, and the high and low thresholds of said comparators are chosen so that said control unit receives alternately line open circuit monitor frames and overcurrent monitor frames for the respective output channels of the group of output channels.

8. An input device for a programmable automatic controller, comprising a group of input channels and a circuit for routing data relating to said input channels to an input and/or output control unit connected by at least a data bus to a central processing unit, said control unit managing input and output data of said central processing unit and generating at least a clock signal and a frame signal, said routing circuit comprising for each of said input channels:

means for generating a state voltage representating a state of said input channel, means for modifying said state voltage upon occurrence of an electrical fault on said input channel, an analog comparator unit comprising a first comparator having a first input which receives said state voltage, a second input which receives a high threshold voltage, and a first output, and a second comparator having a third input which receives said state voltage, a fourth input which receives a low threshold voltage and a second output, a processor logic circuit having a selecting circuit which receives said frame signal and alternatively connects said first output and said second output to an input of a parallel/serial converter having a plurality of inputs respectively belonging to said input channels, said parallel/serial converter being controlled by said frame signal so as to apply on an input of the control unit, alternatively line open monitor frames and state frames, each containing information about each of said input channels.

9. Device according to claim 8 wherein said means for modifying said state voltage, and said high and low thresholds are chosen so that said control unit receives alternately state frames and line open monitor frames for the respective input channels of the group of input channels.

10. Device according to claim 8, wherein said first and second outputs of said comparators are connected to said selecting circuit by respective filter means, each having a filter time which is controlled by a configuration logic circuit.

11. Device according to claim 8 comprising a supply voltage monitor unit comprising a first comparator receiving on a first input a channel supply voltage and on a second input a threshold voltage, said comparator having an output provided with filtering means, said output being connected to said selecting circuit.

* * * * *